United States Patent
Souhaite et al.

(10) Patent No.: US 7,843,978 B2
(45) Date of Patent: Nov. 30, 2010

(54) PASSIVELY Q-SWITCHED LASER WITH ADJUSTABLE PULSE REPETITION RATE

(75) Inventors: Grégoire Souhaite, Crolles (FR); Jean-Philippe Feve, Le Touvet (FR)

(73) Assignee: JDS Uniphase Corporation, Milpitas, CA (US)

(*) Notice: Subject to any disclaimer, the term of this patent is extended or adjusted under 35 U.S.C. 154(b) by 664 days.

(21) Appl. No.: 11/051,023

(22) Filed: Feb. 4, 2005

(65) Prior Publication Data

US 2006/0176913 A1 Aug. 10, 2006

(51) Int. Cl.
*H01S 5/0687* (2006.01)
(52) U.S. Cl. .............................. 372/33; 372/30; 372/34
(58) Field of Classification Search .................. 372/33
See application file for complete search history.

(56) References Cited

U.S. PATENT DOCUMENTS

| | | | | |
|---|---|---|---|---|
| 4,847,851 A | | 7/1989 | Dixon .......................... 372/75 |
| 5,226,051 A | * | 7/1993 | Chan et al. ..................... 372/30 |
| 5,422,899 A | * | 6/1995 | Freiberg et al. ................ 372/25 |
| 5,912,912 A | | 6/1999 | Caprara et al. ................ 372/25 |
| 5,991,315 A | * | 11/1999 | Injeyan et al. ................. 372/11 |
| 6,038,240 A | | 3/2000 | Deutsch et al. ............... 372/25 |
| 6,193,711 B1 | | 2/2001 | Connors et al. ............... 606/12 |
| 6,418,154 B1 | | 7/2002 | Kneip et al. ................... 372/25 |
| 2003/0138005 A1 | | 7/2003 | Hirofumi et al. .............. 372/25 |

FOREIGN PATENT DOCUMENTS

| WO | 97/31411 | 8/1997 |
|---|---|---|
| WO | 01/28050 | 4/2001 |

OTHER PUBLICATIONS

"Miniature, Pulsed Ti: Sapphire Laser System", By J. Zayhowki et al., *IEEE J. of Quantum Electronics*, vol. 38, n. 11, pp. 1449-1454, Nov. 11, 2002.
EP Search Report from corresponding European Application No. 06250294.3.

* cited by examiner

Primary Examiner—Jerome Jackson, Jr.
(74) Attorney, Agent, or Firm—Matthew A. Pequignot; Pequignot + Myers LLC

(57) ABSTRACT

A method is disclosed for varying a pulse repetition rate of a passively q-switched laser while maintaining other characteristics of the laser radiation. The laser is optically pumped with a sequence of pump pulses which includes alterations between non-zero power levels and is characterized by two adjustable parameters. By simultaneously changing the adjustable parameters, the pulse repetition rate of the laser can be changed while maintaining the laser pulse energy, divergence of the pulsed laser radiation, and optical spectrum of the pulsed laser radiation at constant levels. In one embodiment, the sequence of pump pulses includes pump power offset which magnitude and/or duration is adjusted when the laser repetition rate is changed.

6 Claims, 10 Drawing Sheets

PASSIVELY Q-SWITCHED LASER WITH ADJUSTABLE PULSE REPETITION RATE

FIELD OF THE INVENTION

The present invention generally relates to pulsed optically-pumped lasers, and more particularly to passively Q-switched diode-pumped solid-state lasers with variable repetition rates.

BACKGROUND OF THE INVENTION

Passively Q-switched diode-pumped solid state lasers have been widely used in applications requiring optical sources of pulsed radiation because they are efficient, compact and available at several wavelengths in visible and UV wavelength ranges. However, in their standard mode of operation they produce pulses at a fixed repetition frequency often referred to as a free-running frequency, which makes it difficult to adopt these lasers in applications requiring adjustable pulse repetition rate. Although methods of varying the pulse repetition rate of passively Q-switched lasers have been disclosed, difficulties remain in adopting these lasers in those applications requiring repetition-rate independent lasing characteristics, such as pulse energy, pulse to pulse stability, beam profile and divergence.

An example of such applications is matrix-assisted laser desorption/ionization (MALDI) mass spectroscopy, typically requiring UV lasers with pulse repetition rate in the range from tens of Hz to few kHz and very stable characteristics.

In passive Q-switching, a laser cavity typically includes a gain element, typically a small piece of laser crystal, also referred hereinafter as a laser microchip, and a saturable absorber sandwiched between two laser mirrors. The gain medium is pumped by a source of pump radiation, preferably a high-power laser diode. In a most common cw pumping mode, the laser diode continuously pumps the gain medium at a constant power level $P_{ump}$; at a start of operation the saturable absorber is in a high-loss state preventing a lasing action by effectively blocking the lightpass within the cavity. The continuous pumping energizes the gain element by inducing a build-up of population inversion of a lasing transition in the gain medium above a threshold level. Once the population inversion under the cw pumping reaches a certain critical level, intensity of associated amplified spontaneous optical radiation at a wavelength $\lambda$ of the laser transition reaches a level sufficient to cause an abrupt reduction of an optical loss in the saturable absorber, opening up the laser resonator and leading to a fast avalanche-like formation of a laser pulse. The laser pulse drains the resonator from the accumulated energy leaving the population inversion well below the threshold level. After the pulse ends, the saturable absorber switches back to the high-loss state, and the process of the population inversion build-up starts again. The time $B_{up}$ required for the population inversion to reach the critical level from the low after-pulse level, commonly referred to a build-up time, determines the free-running pulse repetition rate $F_{free} \approx 1/B_{up}$.

FIG. 1 illustrates the free-running operation of a passively Q-switched laser by means of a timing diagram showing the cw pump power Pump and the optical output of the laser in a form of optical pulses 20 separated by the time interval $B_{up}$.

FIG. 2 shows a timing diagram illustrating a prior-art method of operation of a passively Q-switched laser at a pulse repetition rate F other than $F_{free}$ by employing pulsed pumping. In this method, the pumping 11 is stopped after each pulse 21 and starts again after a selected time delay 13 so that a time period between pulses $T \geq B_{up}$. The pulse repetition rate in this case $F=1/T<F_{free}$.

A drawback of this mode of operation, hereinafter referred to as a fixed frequency mode, is that a thermal loading of the gain element changes whenever the repetition rate F is changed, as is explained hereinafter. The varying thermal loading changes temperature distribution within the gain element, thereby changing the thermal lens which is typically created in the laser microchip due to heat generated by pump absorption in the gain element, which significantly affects many characteristics of the laser radiation such as pulse energy, beam divergence, pulse-to-pulse stability, etc.

The thermal loading of the gain element, that can be defined as heat generated in the microchip due to pump absorption, has to be therefore maintained constant throughout laser operation even when the repetition rate is changed. This thermal loading is a function of an average pump power $P_{ave}$ dissipated in the gain element in the form of heat. For the aforedescribed pulsed method of operation, the average dissipated pump power $P_{heat}$ is approximately given by equation (1):

$$P_{heat} = \alpha \beta P_{ave} \qquad (1)$$

where $\alpha$ is a fractional thermal loading, i.e. a part of the absorbed optical power which is dissipated as heat within the gain element, and $\beta$ is a fraction of the average optical power which is absorbed by the microchip.

For a diode-pumped laser, the average optical power in the fixed frequency mode is given by equation (2):

$$P_{ave} = (I - I_{th})R\eta \qquad (2)$$

where $\eta$ is a slope efficiency of the laser diode, which is typically around 1 W/A, $I_{th}$ and I are respectively the threshold current of the laser diode and the laser current providing the pump pulse, and R is the diode duty cycle defined as a ratio of the build-up time to the period between pulses:

$$R = B_{up}/T = F B_{up}. \qquad (3)$$

It follows from equations (1), (2) and (3) that the heat dissipated within the microchip, or the thermal load, is directly proportional to the duty cycle R and changes proportionally to the repetition rate F.

J. Zayhosky et al. in an article published in IEEE J. of Quantum Electronics, vol. 38, n. 11, pp. 1449-1454, 2002, disclosed a q-switched laser system wherein the pump power $P_{ump}$ is so high that the build-up time $B_{up}$ is small compared to the pulse period T in a range of repetition rates of interest, so that the thermal loading remains approximately constant within this range. This method however requires a very high pump power and limits the range of possible repetition rate change.

U.S. Pat. No. 6,038,240, in the names of Deutsch et al., discloses a method and solid-state laser system for generating laser pulses with a variable pulse repetition frequency and constant beam characteristics, wherein an actively Q-switched laser is pumped with a train of pump pulses which duty cycle R is kept constant when the repetition rate changes, and wherein the laser pulse is triggered externally by opening an active Q-switch at a fixed time delay relative to the beginning of each pump pulse. This method, although providing certain benefits for actively Q-switched laser systems, for passively Q-switched laser is limited to a range of repetition frequencies between $F_{free}$ and $0.5 \times F_{free}$, since a pump pulse cannot be longer than $2B_{up}$ without triggering a second laser pulse.

U.S. Pat. No. 6,418,154, in the names of Kneip et al., discloses a pulsed diode-pumped solid-state laser with active Q-switching, wherein a Q-switch and a diode-laser array are cooperatively controlled by a controller such that laser output-pulses produced in response to pump-light pulses have the same energy independent of the time-interval between laser output-pulses. In this invention, a laser pulse is actively externally triggered as soon at a pump-light pulse is terminated, and the diode-laser array is arranged to deliver sufficient additional pump-light to the gain-medium, between termination of each pump-light pulse and initiation of a subsequent pump-light pulse, such that gain in said gain-medium is the same at the initiation of each pump-light pulse independent of the time interval between said pump-light pulses. The additional pump-light between pump-pulses is intended to maintain gain at a minimum level so to compensate for an exponential decay in time of the population inversion after a termination of pumping, which causes initial conditions of the laser at a beginning of a pump pulse to be dependent on the time period between consecutive pulses, thereby leading to variations of the laser pulse energy when the pump pulse repetition rate is changed. This method of pumping the gain medium, although appearing to perform its intended function for an actively Q-switched laser, may lead to an average pump-light power which is repetition-rate dependent, and therefore, at least in the case of microchip lasers with passive Q-switching, may lead to variations of laser characteristics in dependence on the repetition rate.

An object of this invention is therefore to provide a Q-switched laser apparatus and a method of operation thereof for generating sequences of laser pulses wherein characteristics of the laser pulses is substantially independent on their repetition rate in a wide range thereof.

SUMMARY OF THE INVENTION

In accordance with the invention, a method of varying a laser pulse repetition rate of a passively q-switched laser while maintaining a characteristic of laser radiation is provided, the method comprising the steps of: a) providing a laser cavity including a gain element and means for passive q-switching; b) providing a sequence of pump pulses into the gain element, said sequence of pump pulses including two different nonzero power levels and characterized by at least two adjustable parameters; c) setting these at least two adjustable parameters to initial values for producing a pulsed laser radiation at a first repetition rate; and d) changing values of each of the at least two adjustable parameters to adjusted values for producing pulsed laser radiation at another repetition rate while controlling a characteristic of the pulsed laser radiation.

In accordance with one aspect of this invention, the adjusted values are selected for maintaining a thermal loading of the gain element at a substantially constant level by maintaining an average pump power constant while changing the laser repetition rate.

In accordance with another aspect of this invention, the characteristic of the pulsed laser radiation is one of pulse energy, divergence of the pulsed laser radiation, optical spectrum of the pulsed laser radiation, a build-up time of the laser pulse.

In accordance with another aspect of this invention, the sequence of pump pulses comprises a cw power offset having a non-zero magnitude, and wherein one of the adjustable parameters is the magnitude of the cw power offset, and a second of the adjustable parameters is a time interval between consecutive pump pulses.

In accordance with another aspect of the invention, a method of operating a q-switched laser with varying time delays between laser pulses is provided comprising the steps of: providing a laser cavity including a gain element and means for passive q-switching, and providing a sequence of pump pulses into the gain element, wherein said sequence of pump pulses includes: i) three consecutive pump pulses having a magnitude above a laser threshold separated in time by two differing time intervals for exciting three laser pulses separated by another two differing time intervals, ii) a first pump pre-pulse between a first and a second consecutive pump pulses, the first pump pre-pulse having a first energy for affecting a temperature in the gain element; and iii) a second pump pre-pulse between the second and a third consecutive pump pulses, the second pump pre-pulse having a second energy different from the first energy for maintaining a characteristic of the laser pulses unchanged by controlling a temperature in the gain element.

In accordance with another aspect of the invention, a laser apparatus for tunable q-switching is provided, comprising a laser cavity including a gain element and means for passive q-switching of said laser cavity; pumping means for pumping the gain element with a sequence of pump pulses for producing a pulsed laser output with a variable repetition rate, said sequence of pumped pulses including alterations between two non-zero power levels and characterized by at least a first parameter and a second parameter; and control means for controlling the sequence of pump pulses and for varying the pulse repetition rate by changing at least the first and second parameters.

BRIEF DESCRIPTION OF THE DRAWINGS

Exemplary embodiments of the invention will now be described in conjunction with the drawings in which.

DETAILED DESCRIPTION

The present invention relates to a Q-switched optically-pumped laser and a method of operation thereof for emitting laser pulses with an adjustable laser pulse repetition rate and repetition rate-independent pulse characteristics. The laser has a gain element pumped with a sequence of optical pump pulses, which includes alterations between at least two nonzero pump power levels. Control means are provided for adjusting at least two parameters of the sequence of pump pulses to control a thermal loading of the gain element by controlling a time-average pump power, while changing the laser pulse repetition rate. This enables a temperature distribution within the gain element to be controlled at a constant level substantially independent on the pulse repetition rate, thereby controlling output laser characteristics.

DESCRIPTION OF THE PREFERRED EMBODIMENTS

Figure 1:
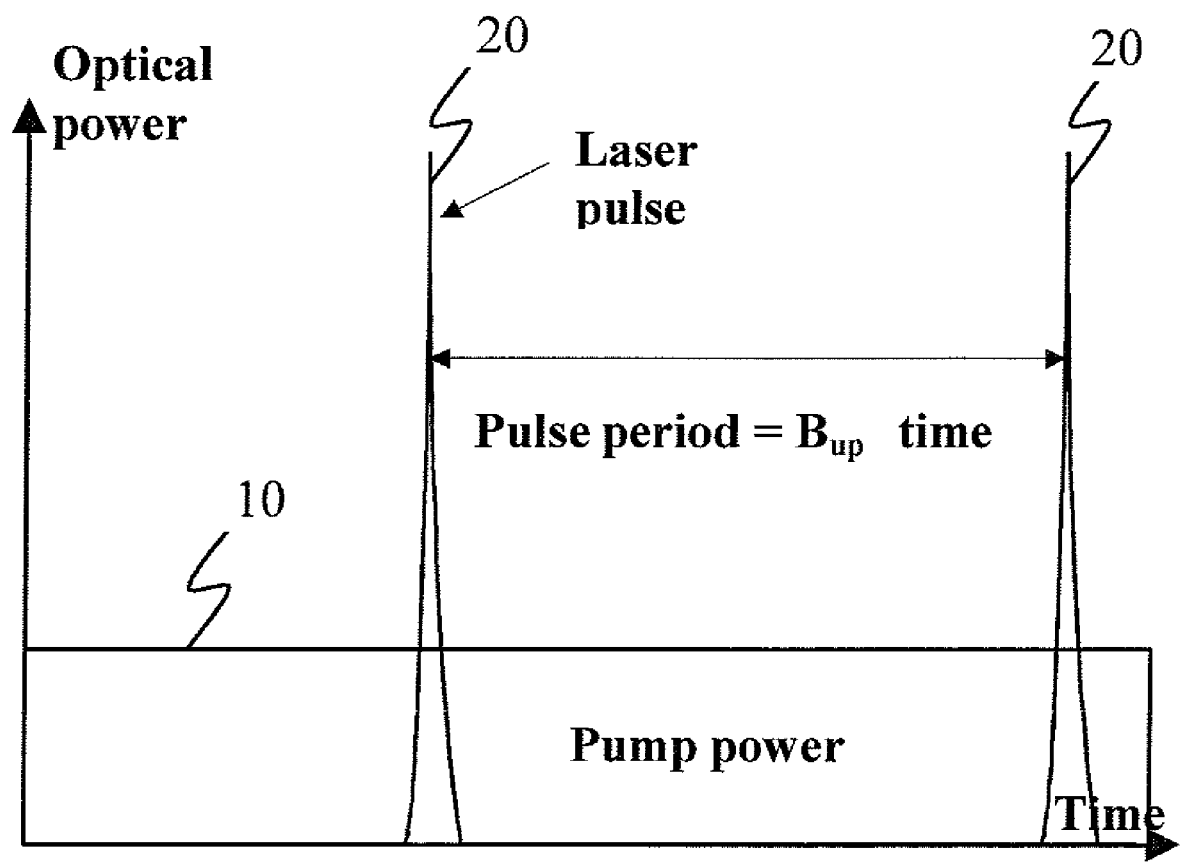
FIG. 1 is a timing diagram of a free-running mode of operation of a conventional passively Q-switched laser.
Figure 2:
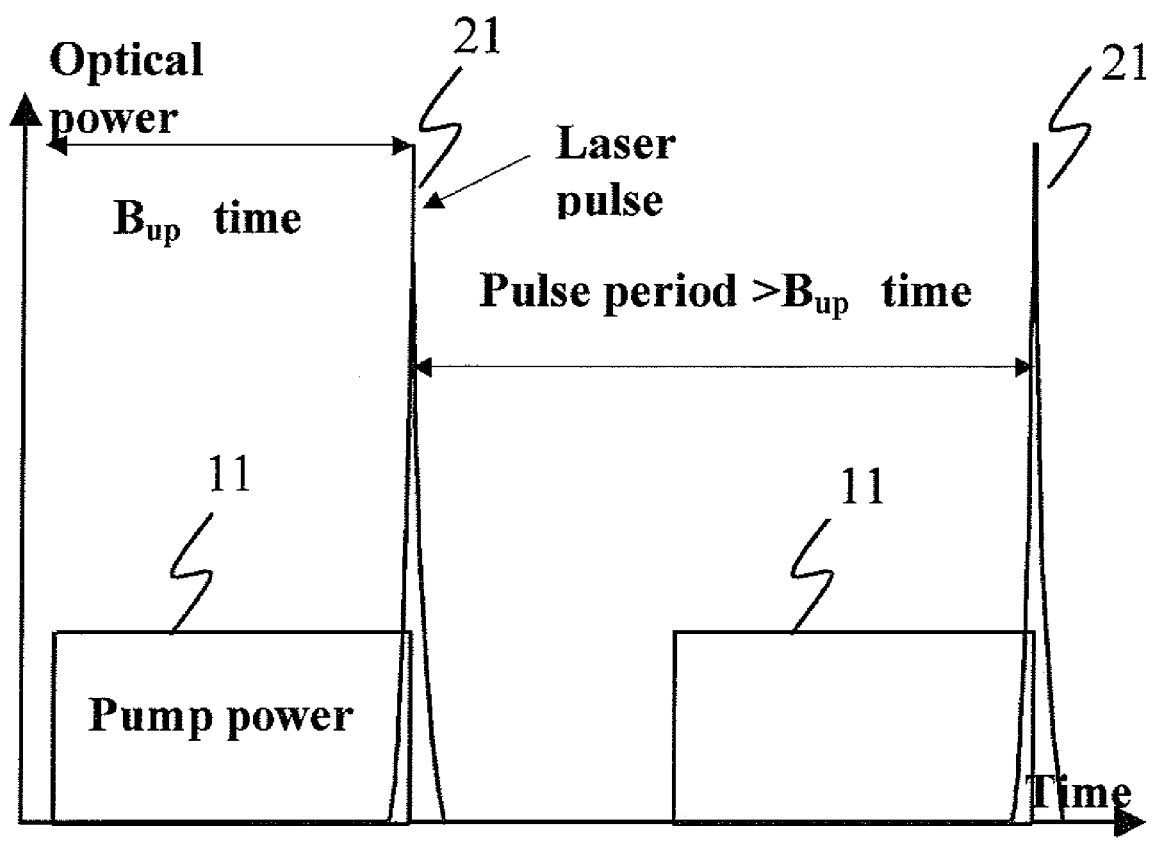
FIG. 2 is a timing diagram of a fixed-frequency mode of operation of a conventional passively Q-switched laser.
Figure 3:
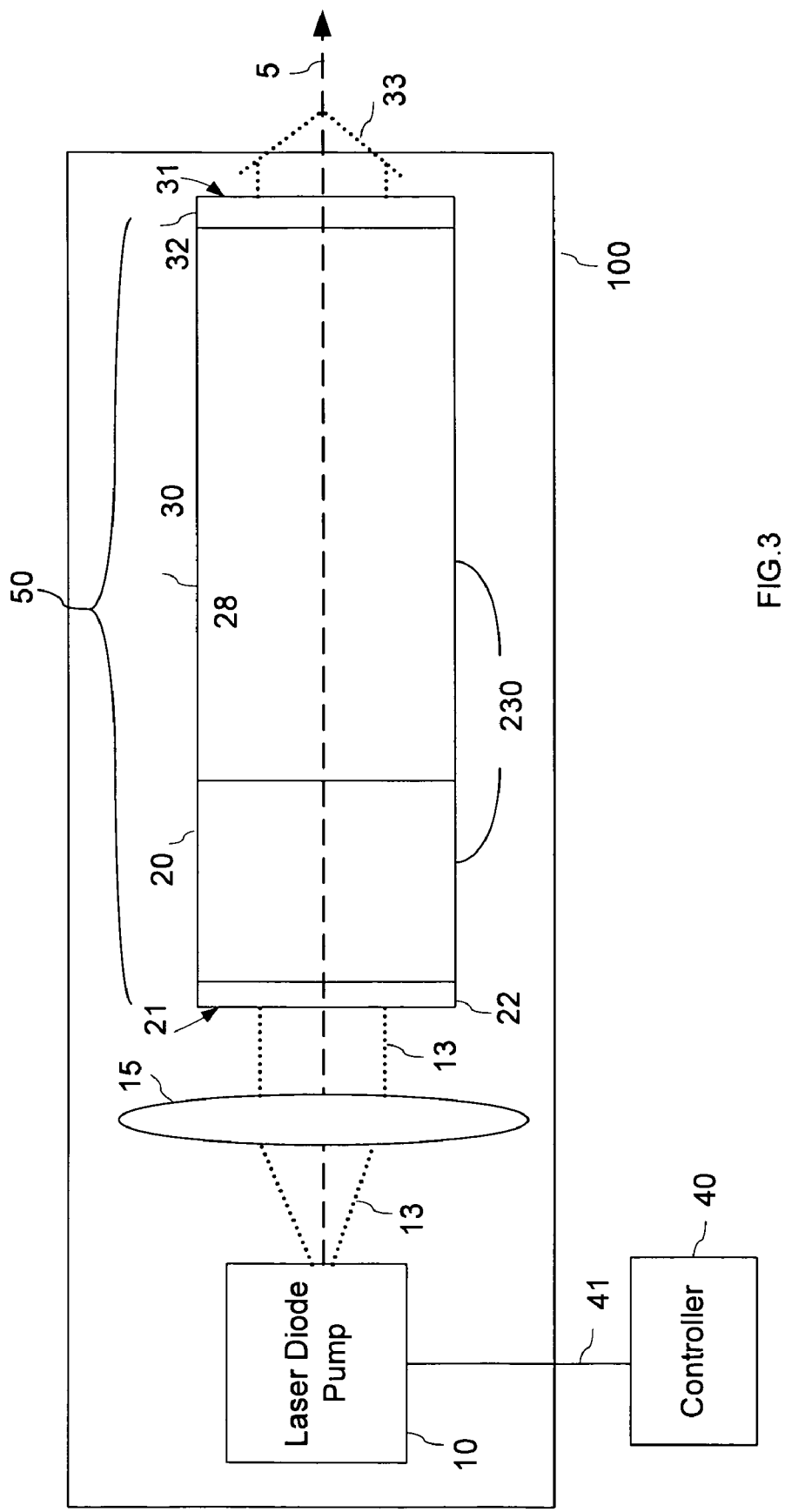
FIG. 3 is a diagram of a passively Q-switched diode-pumped laser according to the present invention.

An exemplary embodiment of a Q-switched laser according to the invention is shown in FIG. 3 and is hereafter described.

A microchip laser cavity 50 is comprised of a gain element 20 and a saturable absorber 30 optically bonded thereto forming a monolithic laser block 230 disposed along an optical axis 5. The gain element 20 has a laser transition at a laser wavelength $\lambda$ and is capable of providing optical gain in response to optical pumping at a pump wavelength $\lambda_p$. The monolithic laser block 230 has an input laser facet 21 for receiving pulsed pump radiation 13 at the pump wavelength $\lambda_p$, and an output laser facet 31 for outputting pulsed laser radiation 33 at the laser wavelength $\lambda$. The input and output facets 21 and 31 have thin film coatings 22 and 32, respectively, reflective at the wavelength of the laser radiation $\lambda$, forming a laser cavity therebetween at said wavelength. The input laser facet 21 faces a laser diode pump 10 or any other suitable pump laser, which is disposed to emit the pulsed pump radiation 13 along the optical axis 5 towards the input facet 21 of the microchip laser cavity 50. The thin film coating 22 is selected so that the input laser facet 21 is substantially transparent to the pump radiation at the wavelength $\lambda_p$ as known to those skilled in the art.

By way of example, the gain element 20 is embodied as a doped crystal Nd:YAG of 3 mm length cut to 1.8×1.8 mm cross-section having a laser transition at the wavelength 1064 nm when optically pumped at the pump wavelength 808 nm, and the saturable absorber 30 is embodied as a Cr4+:YAG crystal of 2.25 mm length and the same cross-section. In some embodiments, the optically bonded Nd:YAG crystal and the Cr4+:YAG crystal can be sandwiched between two pieces of undoped YAG crystals not shown in FIG. 3.

The laser diode pumping means 10 is preferably a high-power laser diode pump capable of emitting the pulsed pump radiation 13 in response to a drive current flowing through the laser diode. The laser diode pump 10 includes laser diode drive circuitry for providing the drive current in response to a control signal provided by a controller 40 through a communication link 41. A lens 15 is provided between the laser diode 10 and the microchip laser cavity 50 for collimating the pump radiation 13 and for coupling it into the microchip laser cavity 50 through the input facet 21. The lens 15 can be a system of lenses adopted to couple pump radiation into a laser crystal as known to those skilled in the art.

In operation, the pulsed pump radiation 13 emitted by the laser diode 10 is absorbed in the gain element 20, inducing a population inversion of the laser transition and a spontaneous emission of radiation at the wavelength of the laser transition. If the pump power $P_p$ delivered by the pump beam 13 into the gain element 20 exceeds a threshold value $P_{th}$ for a time duration $B_{up}$, the microchip laser cavity 50 emits a short laser pulse of a duration $\tau \ll B_{up}$, at the end of which the population inversion drops to a low level below a threshold value required for lasing. If the pump power is below $P_{th}$, the saturable absorber remains in a state of high loss preventing lasing as long as $P_p < P_{th}$.

A portion of the pulsed pump radiation 13 is non-radiatively absorbed in the gain element 20 and is converted into heat, creating a thermal lens within the gain element 20 that affects many characteristics of the laser radiation such as its energy, divergence, pulse-to-pulse stability, etc. Due to a relatively slow rate of thermal dissipation in the gain element 20, the thermal lens is affected primarily by time-averaged pump power $P_{av} = \int dt\, P_{ump}(t)/T_{in}$, where $P_{ump}(t)$ is a time-dependent pump pulse sequence, and integration is performed over a time interval $T_{in} \gg B_{up}$ and exceeding typical time intervals between pump pulses. It is therefore advantageous for laser characteristics stability to keep the average pump power at a constant level during laser operation.

Figure 4:
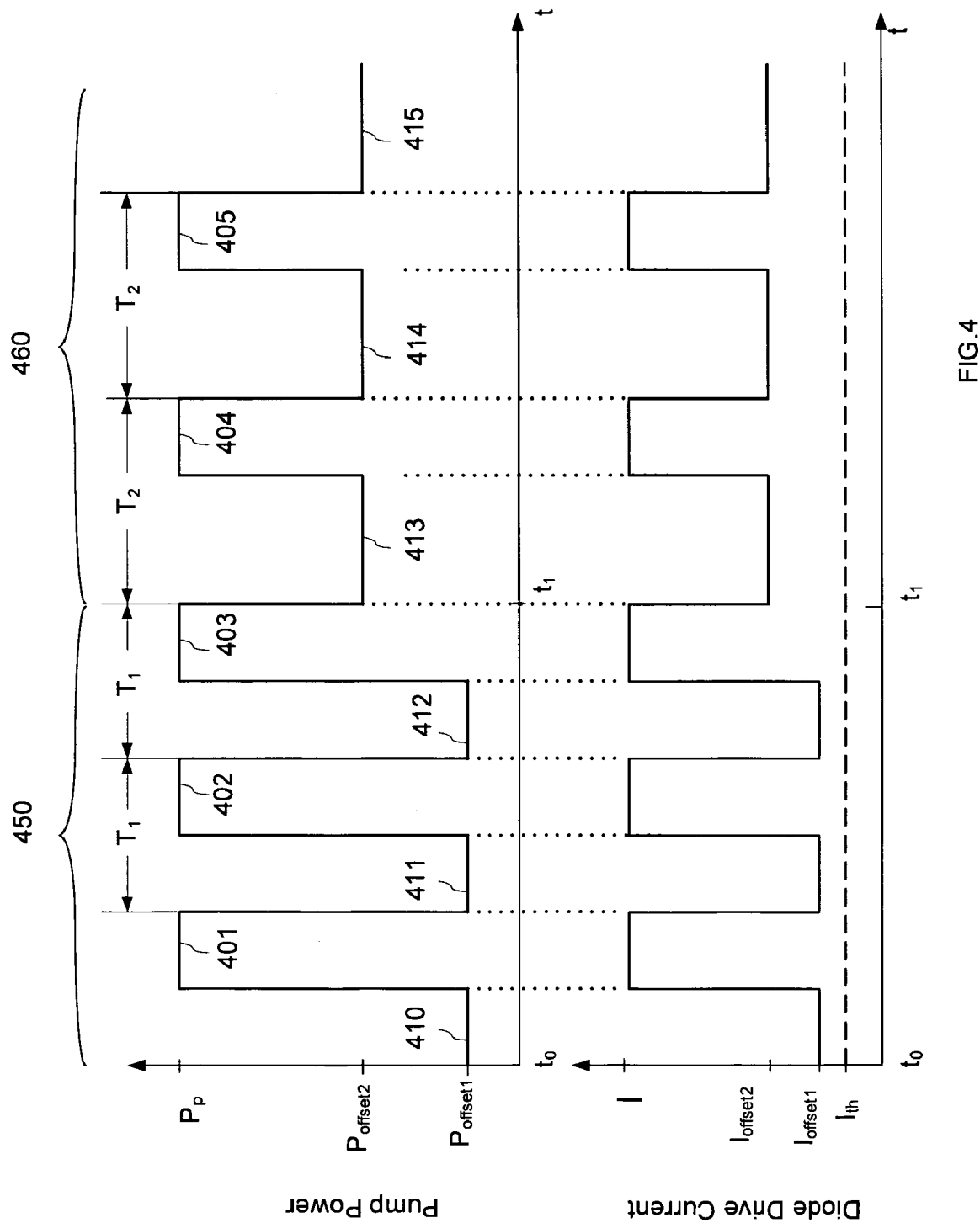
FIG. 4 is a timing diagram of a first variable-rate mode of operation of the passively Q-switched laser of FIG. 3.

One mode of operating the aforedescribed passively Q-switched laser providing stable lasing with constant laser characteristics is depicted in FIG. 4 in a form of a timing diagram. In this mode of operation, the microchip laser cavity 50 is pumped by a pump sequence wherein a cw offset pump radiation is superimposed onto the pump pulses, and optical power $P_{off}$ of the offset pump radiation is adjusted when the pump pulse repetition rate is changed.

With reference to FIG. 4, between time instances $t_0$ and $t_1$ the laser diode pump 10 emits, with a time period $T_1$, consecutive pump pulses 401, 402 and 403 having the pump pulse power $P_p > P_{th}$ and a duration $\tau_p = B_{up}$. Between the pulses the laser diode pump 10 emits the cw offset pump radiation having a constant pump power $P_{off1} < P_{th}$. The pulses are separated in time by a first time interval $T_1 - \tau = T_1 - B_{up}$. The microchip laser cavity 50 emits a laser pulse at the end of each consecutive pump pulse, thereby producing a sequence of output laser pulses not shown in FIG. 4 with a first repetition rate $F_1 = 1/T_1$. In other embodiments, the pump pulse duration can be between $B_{up}$ and $2B_{up}$: $B_{up} \leq \tau < 2B_{up}$ without affecting the laser repetition rate.

The pump pulses 401-403 separated by periods of offset radiation 410, 411, 412 form a first sequence of pump pulses 450, which can be described by a time-dependent pump power function $P_1(t)$, including periodic alterations of the pump power between nonzero power levels $P_p$ and $P_{off1}$.

The first pump sequence 450 is characterized by a first set of independently-selectable parameters including a pulse period $T=T_1$, and an offset power level $P_{off} = P_{off1}$. The parameters $T$ and $P_{off}$ are adjustable by adjusting corresponding parameters of a laser diode drive current $J$, which excites the diode laser causing it to emit the pump radiation, and which is responsive to a control signal generated by the controller 40. The build-up time $B_{up}$ determining a time delay between onsets of pump and laser pulses is a function of pump pulse power $P_p$ and is not independently selectable. In this embodiment, the laser diode drive current I exceeds a laser diode threshold current $I_{th}$ both during and between the pump pulses as shown in FIG. 4.

At the time instance $t_1$, in response to a control signal generated by the controller 40, the adjustable parameters T and $P_{off}$ are changed to provide a second pump pulse sequence 460 for producing an output laser pulse sequence not shown in FIG. 4 with a second pulse repetition rate $F_2$. By way of example, $F_2$ in FIG. 4 is less than $F_1$. To affect this change of the pulse repetition rate, the pump pulse period T is set to a new value $T_2 = 1/F_2 > T_1$. Simultaneously, the offset power level $P_{off}$ is increased and set to a new value $P_{off2} > P_{off1}$. This increase in the offset power level, which is a feature of this invention, provides additional thermal loading of the gain element thereby compensating for a decrease in a pump-pulse-induced component of the thermal loading due to a decreased pump duty cycle.

The new value $P_{off2}$ of the pump power offset is dependent on the new pulse repetition rate $F_2$ and, according to one embodiment of the invention, is selected to maintain the thermal loading of the gain element 20 unchanged and substantially equal to the thermal loading thereof during the time interval from $t_0$ to $t_1$. As stated hereinbefore, maintaining the thermal loading at a constant level requires maintaining the average pump power unchanged. For the aforedescribed sequence of pump pulses, which includes periods of constant pump power $P_p$ and periods of constant pump power offset $P_{off}$ with periodic alterations between them, the average power $P_{ave}$ emitted by the diode laser pump 10 satisfies an equation (3):

$$P_{ave} = \eta(I_{offset} - I_{th}) + (I - I_{offset})R\eta \quad (3)$$

where $\eta$ is the diode slope efficiency, $I_{offset}$ is a cw diode offset current corresponding to emitted pump power $P_{off} = \eta(I_{offset} - I_{th})$ and exceeding a diode threshold current $I_{th}$, and I is a peak diode current corresponding to emitted peak pump power $P_p = \eta(I - I_{th})$. Also, $$R = \frac{B_{up}}{T} = B_{up}F \quad (4)$$

is the duty cycle of the pump sequence, which is proportional to the pulse repetition rate F.

According to this embodiment of the method of the invention, the thermal loading of the gain element is maintained constant when the pulse repetition rate F is changed by adjustment of the offset current $I_{offset}$ every time the pulse repetition rate F is changed, so that the average pump power is kept at a constant level. According to equation (3), a required value of the offset current, in dependence on the duty cycle R, and therefore on the repetition rate F, can be found from the following equation (5):

$$I_{offset} = \frac{P_{ave} + \eta I_{th} - IR\eta}{\eta(1 - R)} \quad (5)$$

Figure 5:
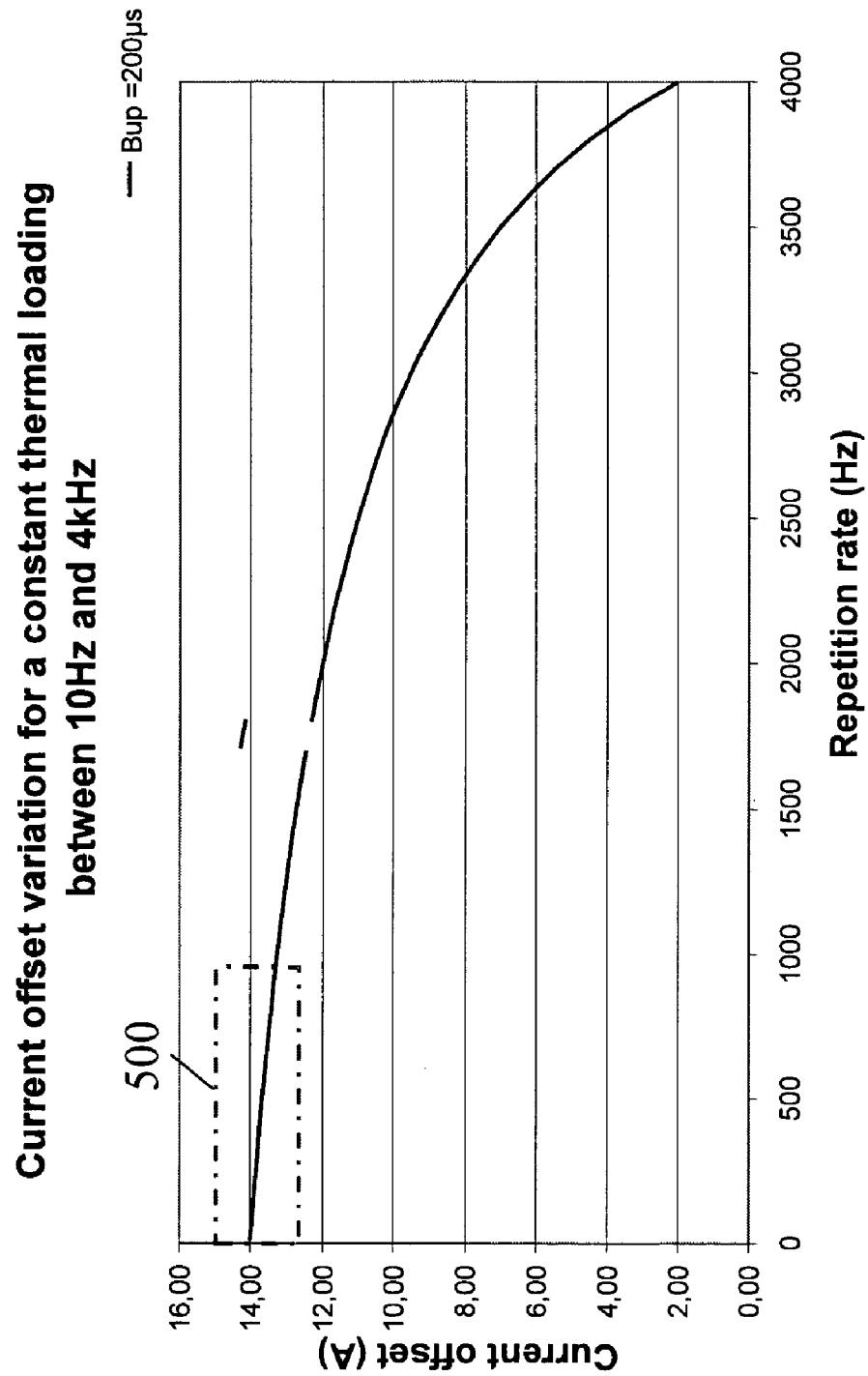
FIG. 5 is a graph showing calculated pump power offset versus the pulse repetition rate.

By way of example, FIG. 5 shows the offset current $I_{offset}$ required to maintain constant thermal loading of a gain element when the pulse repetition rate F varies from 10 Hz to 4 kHz for a typical configuration of a diode-pumped solid state laser with passive Q switching, $B_{up}=200$ μs, $\eta=1$ W/A, $I_{th}=2$ A, $I=17$ A.

Advantageously, FIG. 5 shows that, for a pulse repetition rate F in the range between 10 Hz and approximately 1.5 kHz, or within a box 500 in FIG. 5, $I_{offset}(F)$ can be approximated by a linear function, thereby greatly simplifying implementation of the laser diode controller 40.

Figure 6:
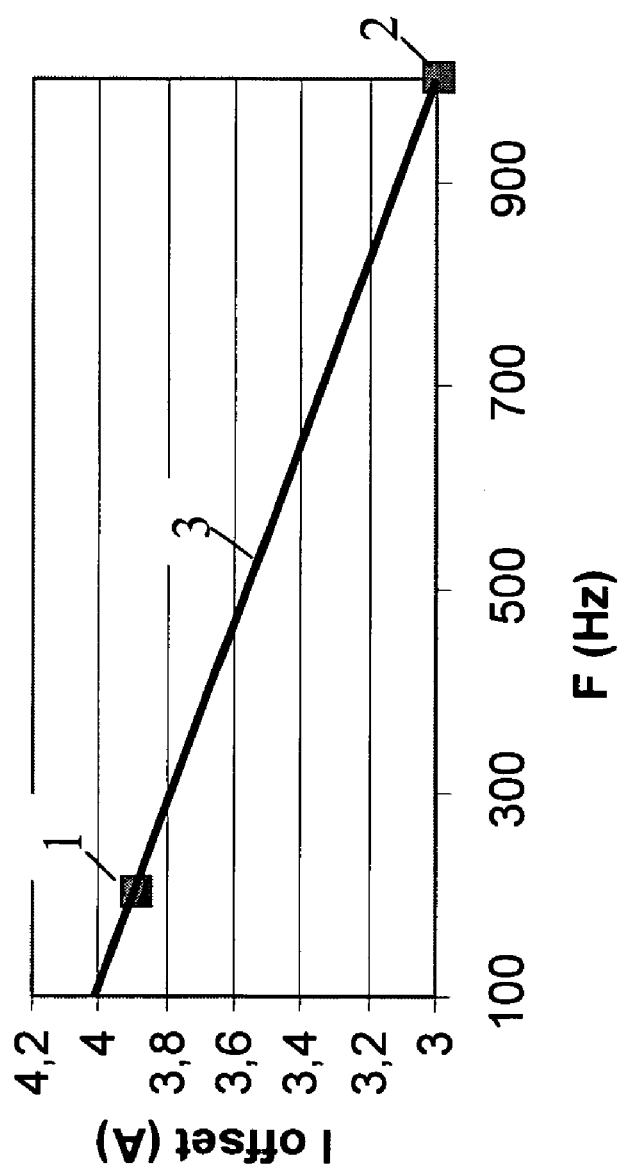
FIG. 6 is an experimental graph showing pump power offset versus a laser repetition rate.

This linear behavior allows for a simple laser calibration procedure, which is implemented in another embodiment of the method to define the pump power offset for a range of repetition rates of interest. By way of example, a passively Q-switched laser incorporating features of this invention has a following set of parameters: $I_{th}=2.3$ A, $\eta=1.106$ W/A, $I=15.6$ A. At a pulse repetition rate $F_1=1$ kHz with the offset current $I_{offset}=I_{offset1}=3$ A this laser was found to exhibit stable pulsed operation with small pulse-to-pulse fluctuations in a temperature range 20.7° C.-23° C. The build-up time $B_{up}$ was measured to be 100 μs. Stability of the laser operation was determined by measuring optical energy $E_{1p}$ per output laser pulse and calculating a relative standard deviation of $E_{1p}$ for a plurality of output laser pulses. Then the pulse repetition rate was changed to $F_2=200$ Hz, and a second offset current $I_{offset2}$ was determined that leads to the same laser temperature range of stable operation. The results of these measurements are shown in FIG. 6 depicting a graph of the offset current $I_{offset}$ versus the repetition rate F(Hz). Black squares labeled with numerals "1" and "2" show stable operating conditions according to the first and second aforedescribed measurements, respectively. A linear fit 3 to the measured operating points 1 and 2 can be used to determine the offset current $I_{offset}(F)$ for any repetition rate F of interest.

Figure 7:
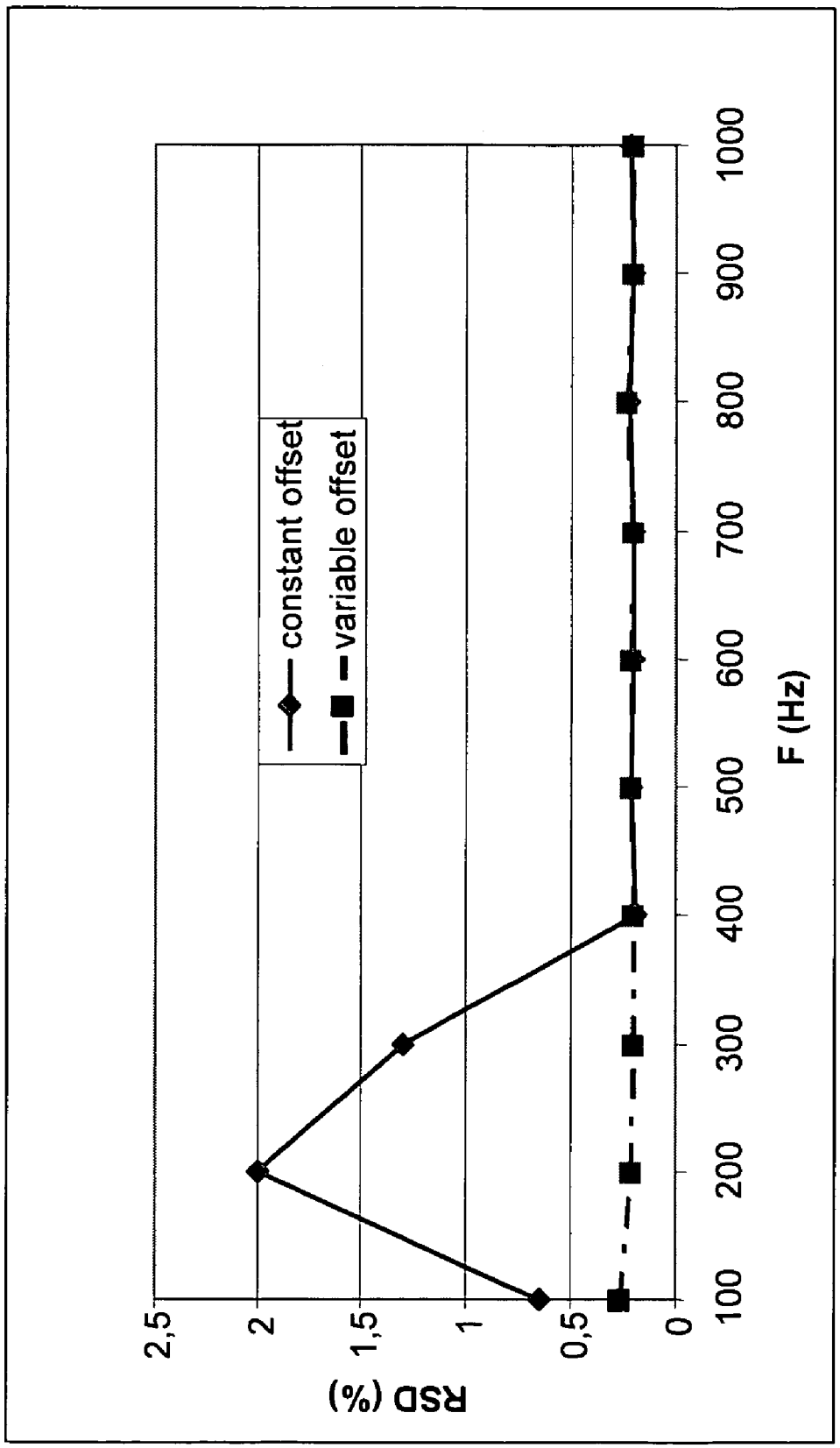
FIG. 7 is an experimental graph showing a standard deviation of the laser pulse power versus the pulse repetition rate.

FIG. 7 shows measured relative standard deviation of the output laser pulse energy $$RSD = \frac{\sqrt{<\delta E_p^2>}}{<E_p>}$$

for various repetition rates between 100 Hz and 1 kHz. The microchip laser cavity 50 was mounted on a heat sink which temperature was maintained constant throughout the measurements. Squares show experimental results obtained using the aforedescribed method of this invention wherein the offset current was linearly varying with the repetition frequency as shown in FIG. 6. Diamonds show results obtained according to a more conventional approach wherein the offset current is maintained at a constant level independent on the repetition frequency. One can see that the method of this invention offers considerably more stable operation, especially at repetition rates below 400 Hz for this particular embodiment.

We have also verified that, advantageously, other laser characteristics, such as the optical spectrum and the divergence of the laser radiation 33, do not vary in dependence on the repetition rate when the offset current $I_{offset}$ was adjusted according to the aforedescribed method, and on the contrary it was not possible to achieve rate-independent laser characteristics while maintaining the offset current at any constant level.

Turning again to FIG. 4, the offset pump radiation 410-415 can be described as pump pre-pulses, which precede the pump pulses 401-405 and which, in the aforedescribed embodiment of the method of this invention, have a duration equal to the pump pulse intervals T−τ. These pre-pulses have insufficient power to cause lasing; their function is to provide an additional thermal loading of the gain element that can be adjusted to offset changes in the duty cycle R when the pulse repetition rate F is changed. This additional thermal loading depends on optical energy $E_p$ of the pump pre-pulses, which is a product of their duration and power: $E_p = P_{off} \times (T-96_p)$. Therefore, same additional thermal loading can be provided using pump pre-pulses of different duration and shape, as long as their energy remains the same, and their magnitude is insufficient to initiate a laser pulse.

Figure 8:
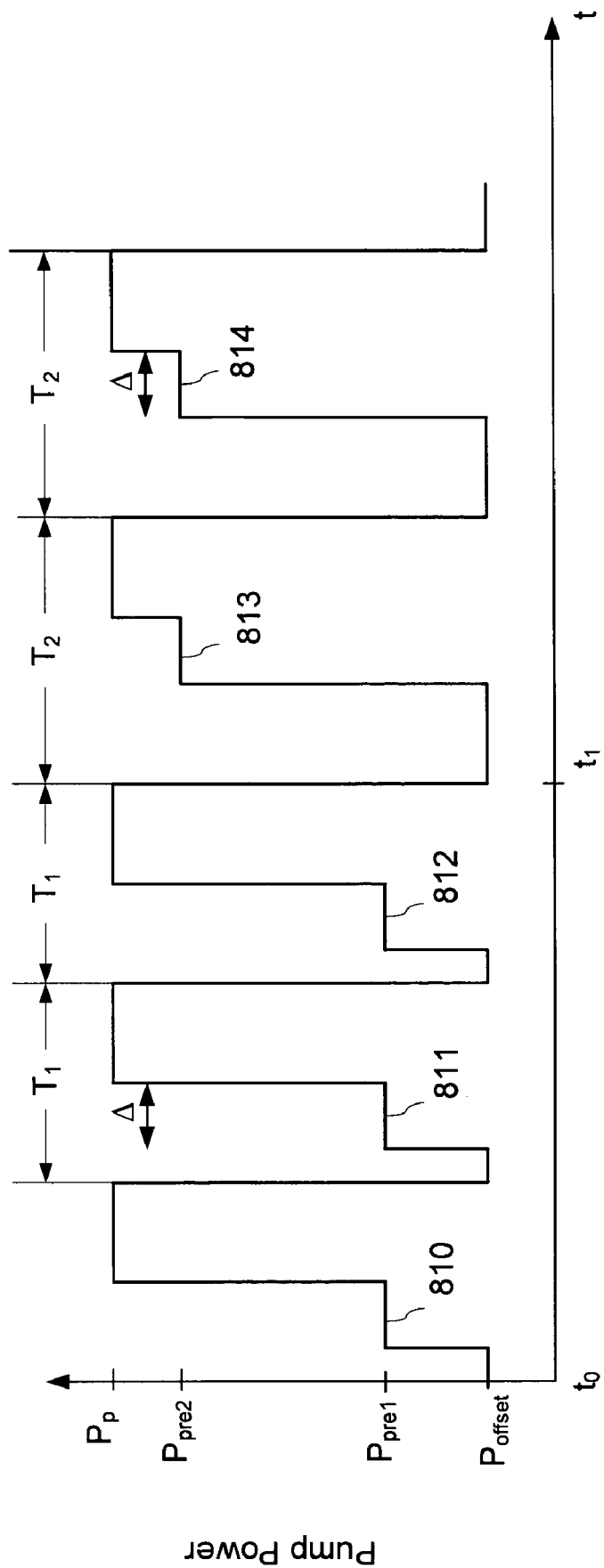
FIG. 8 is a timing diagram of a second variable-rate mode of operation of a passively Q-switched laser according to the present invention.
Figure 9:
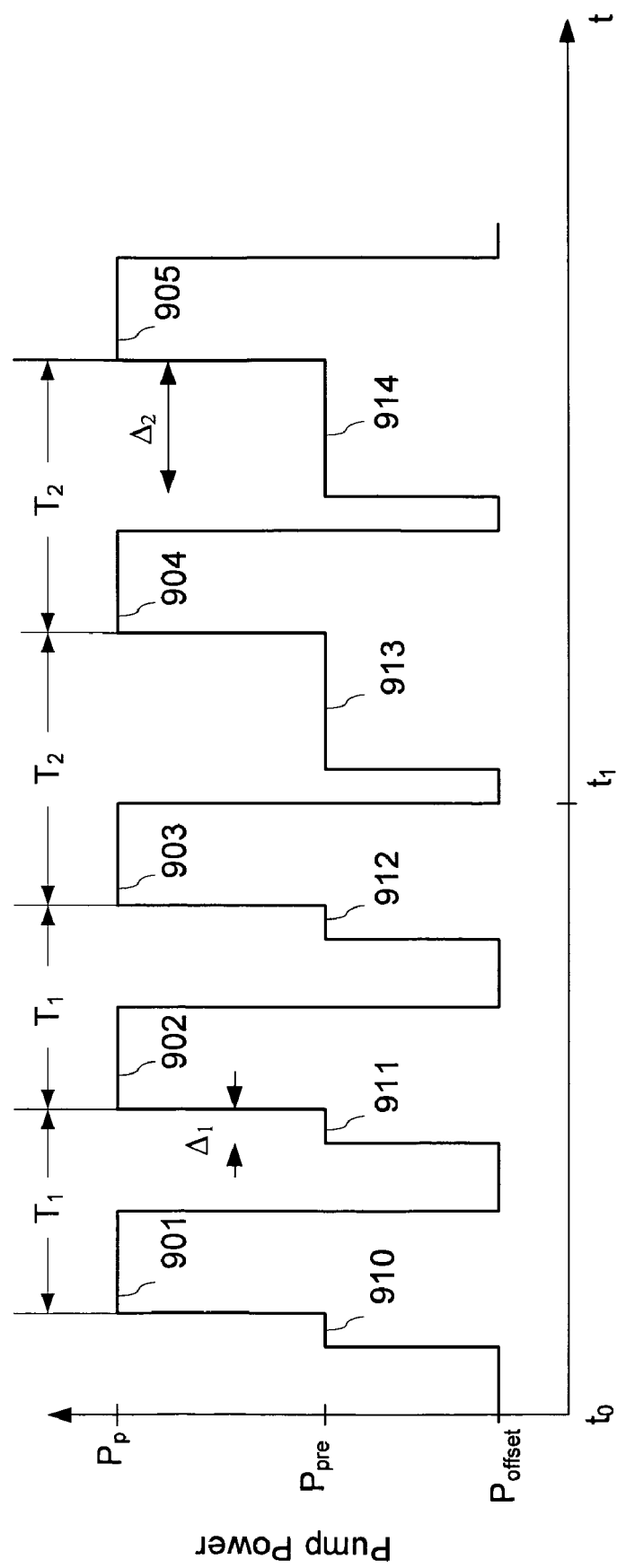
FIG. 9 is a timing diagram of a second variable-rate mode of operation of a passively Q-switched laser according to the present invention.

In FIGS. 8 and 9, two other embodiments of the method is depicted, again in a form of a timing diagram, wherein the offset pump power is changed upwards in-between consecutive pump pulses, forming pump pre-pulses 810-814 and 910-914. These pump pre-pulses have adjustable pump power amplitude $P_{pre}$ and pre-pulse duration Δ, either of which can be changed when the repetition rate, i.e. the time period T of the pump pulses, changes, for maintaining the average pump power and the thermal loading of the microchip laser at a constant level. The offset power $P_{offset}$ in this case can be set to zero in some embodiments. Optimum settings of $P_{pre}$ and $\Delta$ in dependence of the pulse repetition rate F can in this case again be obtained from laser measurements at a laser calibration stage, e.g. by varying the pulse repetition rate and selecting either $P_{pre}$ or $\Delta$ required to maintain a laser output characteristic at a constant level in a given laser temperature range, with the laser output characteristic being one of pulse energy, pulse-to-pulse stability, beam divergence, time-averaged laser spectrum etc.

The method of the present invention, wherein a Q-switched diode-pumped laser with variable pulse repetition rate is optically pumped with a sequence of pump pulses characterized by at least two adjustable parameters, and wherein the at least two adjustable parameters are changed for keeping a laser characteristic constant while changing the repetition rate, can be also advantageously used for enabling laser operation with a constant build-up time $B_{up}$ over a wide range of repetition frequencies. Once again, the conventional mode of operation of passively Q-switched lasers does not typically allow maintaining constant $B_{up}$ if the repetition rate is changed because of the varying thermal loading. As a consequence, it is often difficult to trigger pulsing of the conventional passively Q-switched lasers by an external periodic signal because of said variation of the build-up time. By appropriately changing the adjustable pair of parameters $(T, P_{off})$, $(T, \Delta)$ or $(T, P_{pre})$ in the aforedescribed embodiments, the $B_{up}$ time can be kept constant in a wide range of the repetition rates, enabling the emission of the laser pulse to be triggered by an external signal. A laser calibration procedure wherein $B_{up}$ is measured for various combinations of the adjustable parameters is preferably used to form a look-up table wherein values of e.g. $P_{off}$, $P_{pre}$ and/or $\Delta$ are stored in dependence on T.

Figure 10:
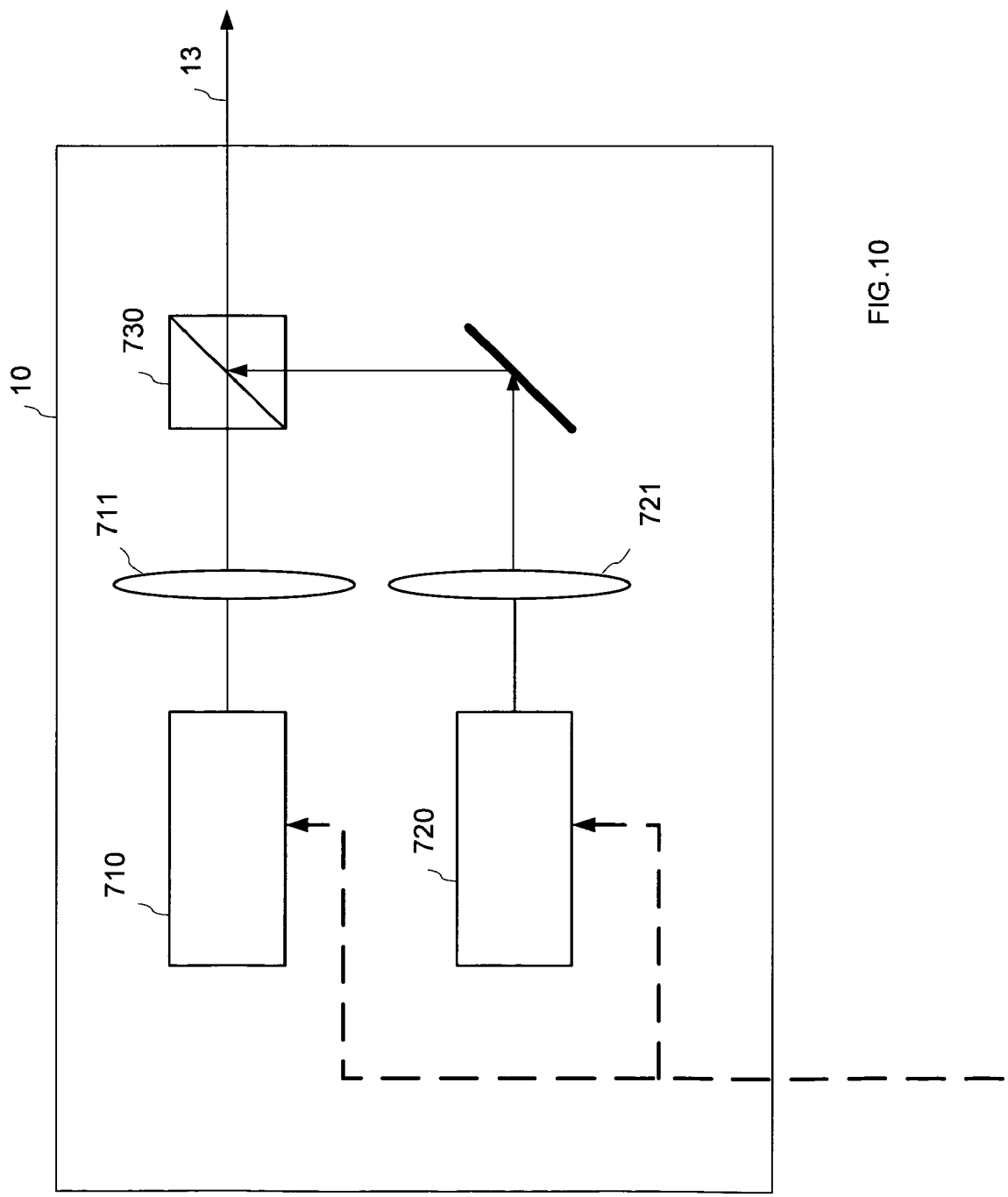
FIG. 10 is a diagram of a diode laser pump with two separately controlled laser diodes according to the present invention.

The method of this invention can be implemented using a single laser diode by varying its drive current as described hereinabove, or by combining radiation from two or more diode lasers. FIG. 10 illustrates another embodiment of the present invention, wherein pump radiation from two diode laser pumps 710 and 720 is first collimated with lenses 711 and 721, and then combined with a beam combiner 730 to form the pulsed pump radiation 13, which is then coupled into the microchip laser cavity 50 shown in FIG. 3. This arrangement can be used, for example, to realize the first embodiment of the method of this invention shown in FIG. 4, with one of the laser diode pumps 710, 720 for operating in a pulsed regime to produce the pump pulses, and another of the laser diode pumps for operating in a cw regime to provide the offset pump power.

In yet another embodiment, the required sequence of pump pulses characterized by at least two adjustable parameters according to the invention can be produced by using one or more cw pumps and an external optical modulator disposed between the pumps and the microchip laser cavity 50.

Those skilled in the art would appreciate that the method of present invention can also be applied to actively Q-switched lasers.

Of course numerous other embodiments may be envisioned without departing from the spirit and scope of the invention.

What is claimed is:

1. A method of varying a laser pulse repetition rate of a passively q-switched laser, comprising:
   a) providing a laser cavity including a gain element and means for passive q-switching;
   b) providing a sequence of pump pulses into the gain element, said sequence of pump pulses having a pulse period $T_1$ for producing a pulsed laser radiation at a first repetition rate, wherein individual pump pulses in the sequence of pump pulses are preceded by pump pre-pulses formed of pump radiation having a pulse power level lower than the pump pulses and insufficient to cause lasing;
   c) changing the pulse period of the sequence of pump pulses from $T_1$ to $T_2$ so as to produce pulsed laser radiation at a second repetition rate; and,
   d) adjusting the pulse power of the pump pre-pulses so as to compensate for a change in a thermal loading of the gain element due to the changing of the pulse period from $T_1$ to $T_2$, wherein the pulse power of the pump pre-pulses is increased if $T_1$ is smaller than $T_2$, and is decreased if $T_1$ is greater than $T_2$.

2. The method of claim 1 wherein the pulse power of the pump pre-pulses is changed in d) to a value selected in dependence on $T_2$ so as to maintain at least one of laser pulse energy, laser temperature range of stable laser operation, pulse to pulse stability of the pulsed laser radiation, beam divergence of the pulsed laser radiation, optical spectrum of the pulsed laser radiation, and a build-up time of a laser pulse at a constant level when the pulse period is changed from $T_1$ to $T_2$.

3. The method of claim 2 wherein the pulse power of the pump pre-pulses is changed in d) to a value selected in dependence on $T_2$ using laser calibration data relating the pulse repetition rate to the pulse power of the pump pre-pulses that is required to maintain a laser characteristic on a constant level, wherein the laser characteristic is one of pulse energy of the pulsed laser radiation, laser temperature range of stable laser operation, pulse to pulse stability of the pulsed laser radiation, beam divergence of the pulsed laser radiation, optical spectrum of the pulsed laser radiation, and a build-up time of a laser pulse of the pulsed laser radiation.

4. The method of claim 1 wherein the pulse power of the pump pre-pulses is adjusted in d) so as to maintain an average pump power over one pulse period at a constant level when the pulse period is changed from $T_1$ to $T_2$.

5. The method of claim 1, wherein b) comprises providing a cw power offset into the gain element to form the pump pre-pulses between pump pulses.

6. The method of claim 5, wherein d) comprises changing a magnitude of the cw power offset to adjust the pulse power of the pump pre-pulses.

* * * * *